United States Patent
Xuan

Patent Number: 5,952,058
Date of Patent: Sep. 14, 1999

[54] LASER TEXTURING MAGNETIC RECORDING MEDIUM USING FIBER OPTICS

[75] Inventor: Jialuo Jack Xuan, Milpitas, Calif.

[73] Assignee: Seagate Technology, Inc., Scotts Valley, Calif.

[21] Appl. No.: 08/954,585

[22] Filed: Oct. 20, 1997

Related U.S. Application Data

[60] Provisional application No. 60/037,627, Jan. 15, 1997.

[51] Int. Cl.$^6$ ...................................................... B05D 3/00
[52] U.S. Cl. ............................... 427/555; 118/35; 118/44; 118/58; 118/500; 118/641; 427/128; 427/129; 427/131; 427/307; 427/402; 427/554; 427/596
[58] Field of Search ..................................... 427/128, 129, 427/131, 554, 555, 596, 307, 402; 118/35, 44, 58, 500, 641

[56] References Cited

U.S. PATENT DOCUMENTS

| | | |
|---|---|---|
| 3,674,340 | 7/1972 | Jacob . |
| 3,764,218 | 10/1973 | Schedewie . |
| 3,938,878 | 2/1976 | Fox . |
| 4,060,306 | 11/1977 | Swaminathan . |
| 4,139,263 | 2/1979 | Lehureau et al. . |
| 5,062,021 | 10/1991 | Ranjan et al. . |
| 5,128,914 | 7/1992 | Kurata et al. . |
| 5,166,006 | 11/1992 | Lal et al. . |
| 5,202,810 | 4/1993 | Nakamura et al. . |
| 5,273,834 | 12/1993 | Hoover et al. . |
| 5,391,522 | 2/1995 | Goto et al. . |
| 5,402,407 | 3/1995 | Eguchi et al. . |
| 5,416,755 | 5/1995 | Endo et al. . |
| 5,550,696 | 8/1996 | Nguyen . |
| 5,595,791 | 1/1997 | Baumgart et al. . |
| 5,790,433 | 8/1998 | Barenboim et al. ............. 364/571.074 |
| 5,848,090 | 12/1998 | Zoll et al. ................................. 372/93 |
| 5,848,325 | 12/1998 | Matsumura ............................... 399/83 |

FOREIGN PATENT DOCUMENTS

0652554 A1   5/1995   European Pat. Off. .

OTHER PUBLICATIONS

Kuo et al., "Laser Zone Texturing on Glass and Glass–Ceramic Substrates," presented at The Magnetic Recording Conference (TMRC), Santa Clara, California, Aug. 19–21, 1996.

Baumgart et al. "A New Laser Texturing Technique for High Performance Magnetic Disk Drives," IEEE Transactions on Magnetics, vol. 31, No. 6, pp. 2946–2951, Nov. 1995.

*Primary Examiner*—Bernard Pianalto
*Attorney, Agent, or Firm*—McDermott, Will & Emery

[57] ABSTRACT

The substrate of a magnetic recording medium is laser textured employing a fiber-optic laser delivery system. Fiber optic cables are optically linked at one end to a laser light beam source, and at the other lens to a microfocusing lens. The use of a fiber optic cable delivery system facilitates alignment and reduces maintenance.

16 Claims, 2 Drawing Sheets

LASER TEXTURING MAGNETIC RECORDING MEDIUM USING FIBER OPTICS

RELATED APPLICATIONS

This application claims priority from provisional patent application Ser. No. 60/037,627, filed Jan. 15, 1997, the entire disclosure of which is hereby incorporated by reference herein.

TECHNICAL FIELD

The present invention relates generally to laser texturing a magnetic recording medium. The present invention is particularly applicable to laser texturing a substrate for a high areal density magnetic recording medium.

BACKGROUND ART

Conventional magnetic disk drive designs comprise a commonly denominated Contact Start-Stop (CSS) system commencing when the head begins to slide against the surface of the disk as the disk begins to rotate. Upon reaching a predetermined high rotational speed, the head floats in air at a predetermined distance from the surface of the disk due to dynamic pressure effects caused by air flow generated between the sliding surface of the head and the disk. During reading and recording operations, the transducer head is maintained at a controlled distance from the recording surface, supported on a bearing of air as the disk rotates, such that the head can be freely moved in both the circumferential and radial directions allowing data to be recorded on and retrieved from the surface of the disk at a desired position. Upon terminating operation of the disk drive, the rotational speed of the disk decreases and the head again begins to slide against the surface of the disk and eventually stops in contact with and pressing against the disk. Thus, the transducer head contacts the recording surface whenever the disk is stationary, accelerated from the stop and during deceleration just prior to completely stopping. Each time the head and disk assembly is driven, the sliding surface of the head repeats the cyclic operation consisting of stopping, sliding against the surface of the disk, floating in the air, sliding against the surface of the disk and stopping.

It is considered desirable during reading and recording operations to maintain each transducer head as close to its associated recording surface as possible, i.e., to minimize the flying height of the head. Thus, a smooth recording surface is preferred, as well as a smooth opposing surface of the associated transducer head, thereby permitting the head and the disk to be positioned in close proximity with an attendant increase in predictability and consistent behavior of the air bearing supporting the head. However, if the head surface and the recording surface are too flat, the precision match of these surfaces gives rise to excessive stiction and friction during the start up and stopping phases, thereby causing wear to the head and recording surfaces eventually leading to what is referred to as a "head crash." Thus, there are competing goals of reduced head/disk friction and minimum transducer flying height.

Conventional practices for addressing these apparent competing objectives involve providing a magnetic disk with a roughened surface to reduce the head/disk friction by techniques generally referred to as "texturing." Conventional texturing techniques involve polishing the surface of a disk substrate to provide a texture thereon prior to subsequent deposition of layers, such as an underlayer, a magnetic layer, a protective overcoat, and a lubricant topcoat, wherein the textured surface on the substrate is intended to be substantially replicated in the subsequently deposited layers.

The escalating requirements for high areal recording density impose increasingly greater requirements on thin film magnetic media in terms of coercivity, stiction, squareness, low medium noise and narrow track recording performance. In addition, increasingly high density and large-capacity magnetic disks require increasingly smaller flying heights, i.e., the distance by which the head floats above the surface of the disk in the CSS drive. The requirement to further reduce the flying height of the head challenges the limitations of conventional technology for controlled texturing to avoid head crash.

Conventional techniques for providing a disk substrate with a textured surface comprise a mechanical operation, such as polishing. In texturing a substrate for a magnetic recording medium, conventional practices comprise mechanically polishing the surface to provide a data zone having a substantially smooth surface and a landing zone characterized by topographical features, such as protrusions and depressions. See, for example, Nakamura et al., U.S. Pat. No. 5,202,810. Conventional mechanical texturing techniques, however, are attendant with numerous disadvantages. For example, it is extremely difficult to provide a clean textured surface due to debris formed by mechanical abrasions. Moreover, the surface inevitably becomes scratched during mechanical operations, which contributes to poor glide characteristics and higher defects. Such relatively crude mechanical polishing with attendant scratches and debris makes it difficult to obtain adequate data zone substrate polishing for proper crystallographic orientation of a subsequently deposited magnetic layer. In addition, various desirable substrates are difficult to process by mechanical texturing. This undesirably limiting facet of mechanical texturing, virtually excludes the use of many materials for use as substrates.

An alternative technique to mechanical texturing for texturing a landing zone comprises the use of a laser light beam focused on an upper surface of a non-magnetic substrate. See, for example, Ranjan et al., U.S. Pat. No. 5,062,021, wherein the disclosed method comprises polishing an NiP plated Al substrate to a specular finish, and then rotating the disk while directing pulsed laser energy over a limited portion of the radius, to provide a textured landing zone leaving the data zone specular. The landing zone comprises a plurality of individual laser spots characterized by a central depression surrounded by a substantially circular raised rim.

Another laser texturing technique is reported by Baumgart et al. "A New Laser Texturing Technique for High Performance Magnetic Disk Drives," IEEE Transactions on Magnetics, Vol. 31, No. 6, pp. 2946–2951, November 1995. See, also, U.S. Pat. Nos. 5,550,696 and 5,595,791

In copending application Ser. No. 08/666,374 filed on Jun. 27, 1996 a laser texturing technique is disclosed employing a multiple lens focusing system for improved control of the resulting topographical texture. In copending application Ser. No. 08/647,407 filed on May 9, 1996, a laser texturing technique is disclosed wherein a pulsed, focused laser light beam is passed through a crystal material to control the spacing between resulting protrusions.

In copending PCT application Ser. No. 08/666,373, a method is disclosed for laser texturing a glass or glass-ceramic substrate employing a laser light beam derived from a $CO_2$ laser source. The textured glass or glass-ceramic substrate surface comprises a plurality of protrusions which extend above the substrate surface, without surrounding valleys extending substantially into the substrate as is characteristic of a laser textured metallic substrate. The effect of laser parameters, such as pulse width, spot size and pulse energy, and substrate composition on the protrusion or bump height of a laser textured glass or glass-ceramic substrate is reported by Kuo et al., in an article entitle "Laser Zone Texturing on Glass and Glass-Ceramic Substrates," presented at The Magnetic Recording Conference (TMRC), Santa Clara, Calif., Aug. 19–21, 1996.

In copending application Ser. No. 08/796,830 filed on Feb. 7, 1997, a method is disclosed for laser texturing a glass or glass-ceramic substrate, wherein the height of the protrusions is controlled by controlling the quench rate during resolidification of the laser formed protrusions. One of the disclosed techniques for controlling the quench rate comprises preheating a substrate, as by exposure to a first laser light beam, and then exposing the heated substrate to a focused laser light beam.

As areal recording density increases the flying height must be reduced accordingly, thereby challenging the limitations of conventional laser texturing technology for uniformity and precision in texturing a landing zone to form protrusions. The requirements for continuous alignment and adjustment of a laser beam are exacerbated in geographic locations with relatively unstable environmental conditions, such as temperature, vibration and shock, particularly in regions susceptible to seismological disturbances such as tremors and earthquakes. Conventional laser delivery systems for texturing a landing zone comprise a system of mirrors and lenses which must be precisely and accurately maintained, particularly as the flying height is reduced to a level of less than about 300 Å, due to inherent undulations of the substrate surface.

For example, adverting to FIG. 1, the laser texturing apparatus disclosed in U.S. Pat. No. 5,595,791 comprises pulsed laser 10 for laser texturing a substrate 12 on surfaces 14 and 16, while substrate 12 rotates on shaft 20 driven by motor 22. In synchronism with disk rotation and translation, laser 10 is pulsed by signal 18 providing output pulses 24 which are split by deflection with moveable mirror 26 to upper stationary mirror 28 and lower stationary mirror 30. Pulses 24 travelling along the upper path bounce off mirror 28 through focusing lens 32 to a stationary mirror 34 and therefrom to upper surface 14 of rotating substrate 12. Pulses 24 travelling along the lower path bounce off mirror 30 through focusing lens 36 to mirror 38 and therefrom to lower surface 16 of rotating substrate 12. It should be apparent that precision texturing requires continuous maintenance of precise alignment of the system of mirrors and lenses for accurate reproducible texturing of laser formed bumps in a data zone. It is extremely difficult to maintain the requisite precise alignment and satisfy the reduced flying height requirements for high areal density, particularly in geographical locations subjected to environmental changes, and seismological disturbances.

There exists a need for a laser texturing system which facilitates alignment and adjustment of a laser beam and requires minimum maintenance of the laser-optical system, particularly in geographic locations subject to unstable environmental conditions. There exists a particular need for an accurate laser delivery system requiring minimal maintenance for manufacturing high areal density magnetic recording medium.

DISCLOSURE OF THE INVENTION

An object of the present invention is a method and apparatus for accurately texturing a substrate for a magnetic recording medium, requiring minimum maintenance for precise alignment.

Another object of the present invention is a method and apparatus for laser texturing a substrate for a high areal density magnetic recording medium by providing a controllable pattern of protrusions thereon with reduced maintenance for laser-optic alignment.

Additional objects, advantages and other features of the invention will be set forth in each description which follows and in part will become apparent to those having ordinary skill in the art upon examination of the following or may be learned from the practice of the invention. The objects and advantages of the invention may be realized and obtained as particularly pointed out in the appended claims.

According to the present invention, the foregoing and other objects are achieved in part by an apparatus for laser texturing a substrate for a magnetic recording medium, which apparatus comprises: a laser light beam source; a spindle for rotating the substrate during laser texturing; a first lens positioned proximate a first surface of the substrate; and a first fiber optic cable having a first end optically linked to the laser light beam source and a second end optically linked to the first lens.

Another aspect of the present invention is a method of manufacturing a magnetic recording medium, which method comprises: passing a first sub-laser light beam through a first fiber optic cable and then through a first lens to impinge the first sub-laser light beam on a first surface of a rotating substrate to texture the first surface of the substrate.

Additional objects and advantages of the present invention will become readily apparent to those skilled in this art from the following detailed description, wherein embodiments of the invention are described, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BEST MODE FOR CARRYING OUT THE INVENTION

The present invention addresses and solves the difficult problems of aligning and adjusting a laser beam and maintaining precise alignment of the laser optic system to provide a textured surface on a substrate for a magnetic recording medium with the requisite precision to enable low flying height utility. The imposing problems generated by requirements for reduced flying heights to accommodate high areal recording density are exacerbated in geographical locations subject to environmental changes, such as temperature, particularly seismological tremors such as those frequently occurring in the western part of the United States. In accordance with the present invention, the requirement to maintain precise alignment of a system of mirrors and lenses, as in conventional laser optic systems, is avoided by employing a fiber optic delivery system.

In accordance with the present invention, a laser light beam source is optically linked to one end of a fiber optic cable, while the other end of the fiber optic cable is optically linked to a lens, preferably a microfocusing lens. The microfocusing lens is then properly positioned in proximity to a surface of a substrate for a magnetic recording medium and accurately maintained in such position, as with conventional clamps, and the laser light beam impinged on the rotating substrate.

Figure 1:
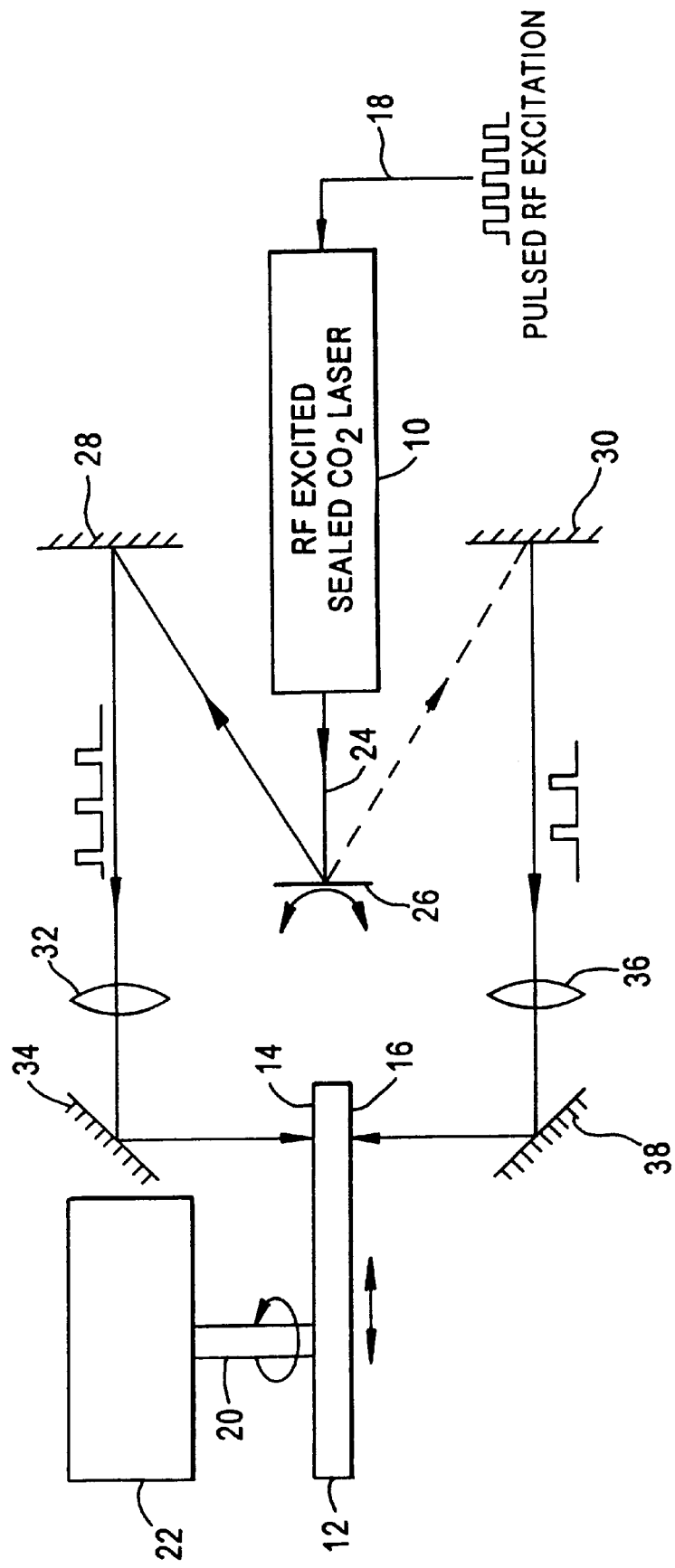
FIG. 1 schematically illustrates a conventional laser-optics system for laser texturing a magnetic recording medium substrate.

In accordance with an embodiment of the present invention, a fiber optic cable is optically linked to a conventional carbon dioxide ($CO_2$) laser light source, which has a wavelength of about 10 $\mu$m, or a yttrium aluminum garnet (YAG) laser light source, which has a wavelength of about 1.064 $\mu$m. The fiber optic cable can be optically linked to the laser light source by coupling to an attenuator which, in turn, is linked to an electric shuttle on a laser head. The other end of the fiber optic cable is optically coupled to a beam splitter. Two additional fiber optic cables can be optically coupled to the beam splitter at one end and optically coupled to a microfocusing lens at the other end. The microfocusing lenses are then positioned in proximity to opposite surfaces of a substrate for laser texturing. Fiber optic cables, by their nature, can be positioned and maintained in alignment with significantly reduced maintenance visa-vis the complex system of mirrors and lenses required for maintaining the requisite alignment precision of conventional laser systems employed for texturing a substrate for a magnetic recording medium. In fact, the requirement for maintaining precise alignment of a system of mirrors and lenses, as in the conventional laser delivery system depicted in FIG. 1 is totally eliminated by employing flexible fiber optic cables to transmit a laser light beam from its source to a target spot on a rotating substrate.

Figure 2:
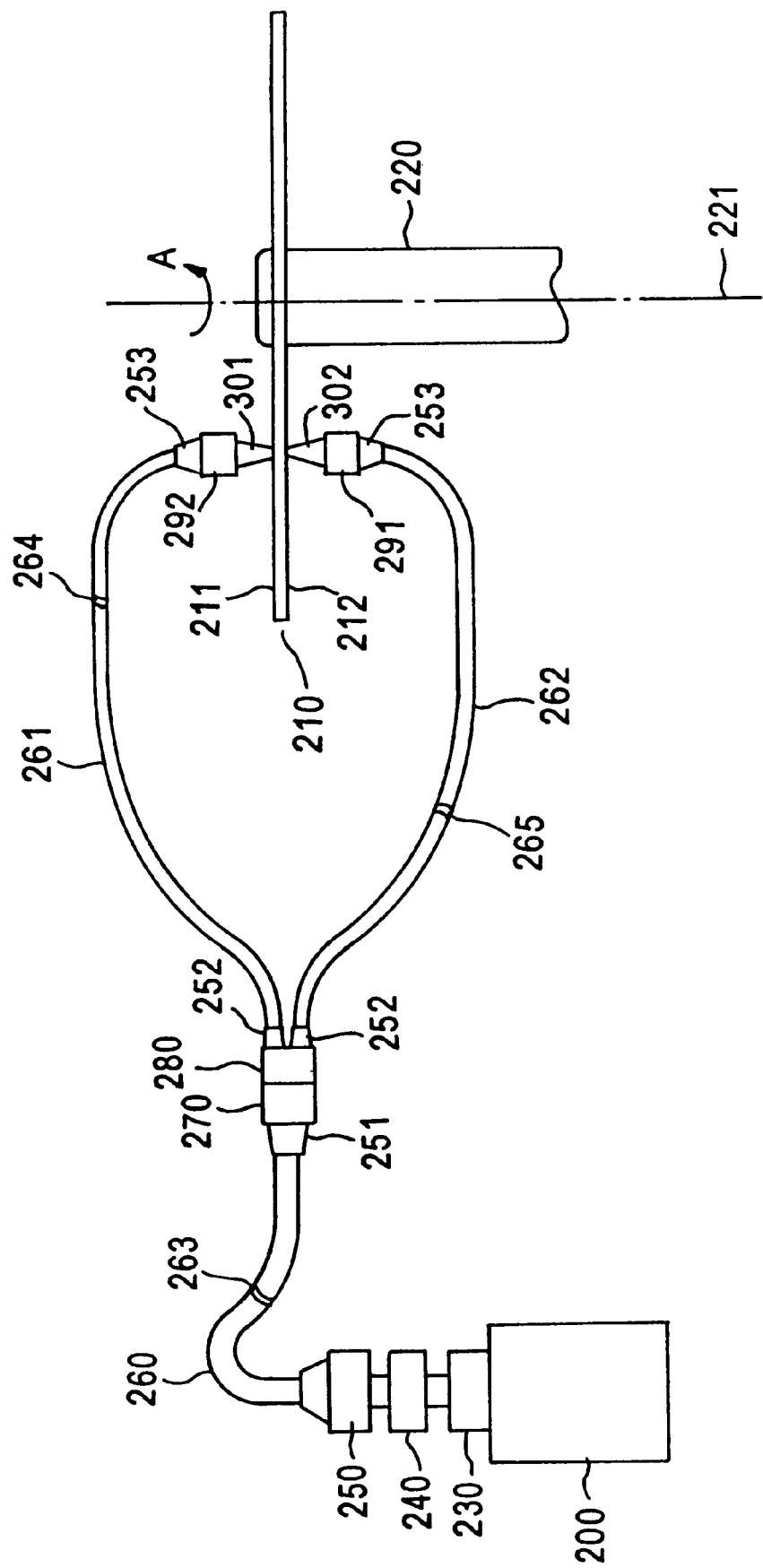
FIG. 2 schematically illustrates a fiber optic laser delivery apparatus in accordance with an embodiment of the present invention.

An embodiment of the present invention is schematically illustrated in FIG. 2 and comprises laser head 200, e.g., a $CO_2$ or YAG laser light beam source for delivering laser light beams to opposite surfaces 211 and 212 of substrate 210 mounted on spindle 220 rotated about axis 221 in the direction indicated by arrow A. A laser delivery system in accordance with the present invention typically comprises an electronic shuttle 230 linked to attenuator 240 and optical coupling 251. Polarizer 280 is connected to beam splitter 270 at one end and optically linked to fiber optic cables 261 and 262 via optical couplings 252. Fiber optic cable 261 is optically linked to microfocusing lens 292 via optical coupling 253, while fiber optic cable 262 is optically linked to microfocusing lens 291 via optical coupling 253. As substrate 210 rotates, sub-laser light beams 301 and 302 impinge upon surfaces 211 and 212, respectively, forming a uniform pattern of precisely formed protrusions. The inventive system employing fiber optic cables can be maintained in position employing conventional clamps 263, 264, 265, thereby considerably reducing the continuous maintenance required for precise alignment of mirrors and lenses as required in conventional laser delivery systems.

One having ordinary skill in the art can easily optimize the rotation speed, pulse duration, and power/pulse of a laser light beam to achieve a suitable pattern and flying height. For example, the substrate can be rotated at a rate of about 200 rpm to about 1500 rpm and exposed to laser light beam derived from a $CO_2$ or YAG laser through the microfocusing lenses for a pulse duration of about 10 nano-seconds to about 100 nano-seconds at a power/pulse of about 1 microjoule ($\mu j$) to about 8 $\mu j$, at a repetition rate (pulse/second) of about 1,000 to about 15,000. Other relevant parameters to control bump height, such as pulse width, pulse energy and spot size, can be optimized by one having ordinary skill in the art consistent with the Kuo et al. publication previously mentioned.

In practicing the present invention, the substrate employed can be any substrate typically employed in the manufacture of magnetic recording media, such as a metal substrate or an alternate substrate comprising a glass, ceramic or glass-ceramic material or such as O'Hara, Hoya and Nippon glass. Other conventional substrates include aluminum alloy substrates with a coating thereon, such as nickel-phosphorous. In texturing a glass, ceramic or glass-ceramic substrate, it is desirable to employ a $CO_2$ laser. In texturing an NiP or metal substrate, it is desirable to employ a YAG laser. As one having ordinary skill in the art would be aware, the microfocussing lens employed with a $CO_2$ or YAG laser should contain an appropriate conventional optical coating for the laser wavelength.

As one having ordinary skill in the art would recognize, conventional practices in manufacturing a magnetic recording medium comprise texturing opposite surfaces of a substrate and depositing a plurality of layers thereon. Laser texturing of one surface of a substrate of a magnetic recording medium in accordance with the present invention is discussed for convenience, it being understood that opposite surfaces of the substrate are laser textured in manufacturing of a magnetic recording medium in accordance with the present invention.

As one having ordinary skill in the art would recognize, after texturing the substrate surfaces in accordance with the present invention, conventional layers are deposited thereon to complete the magnetic recording medium. For example, various conventional magnetic recording media comprise sequentially sputter deposited layers on the substrate, such as an underlayer, magnetic alloy layer and protective overcoat. A lubricant topcoat is also conventionally applied to the protective topcoat.

The magnetic layers deposited in accordance with the present invention can be any of those conventionally employed in the production of magnetic recording media. Such conventional magnetic alloys, include, but are not limited to, cobalt (Co) alloys, such as Co-base alloys, e.g., cobalt-chromium (CoCr), cobalt-samarium (CoSm), cobalt-chromium-tantalum (CoCrTa), cobalt-nickel-chromium (CoNiCr), cobalt-chromium-samarium (CoCrSm), cobalt-chromium-platinum-tantalum (CoCrPtTa), cobalt-chromium-platinum (CoCrPt), cobalt-nickel-platinum (CoNiPt), cobalt-nickel-chromium-platinum (CoNiCrPt) and cobalt-chromium-platinum-boron (CoCrPtB). The thickness of the magnetic layer is consistent with conventional practices and manufacturing a magnetic recording medium. Cobalt-base alloys having a thickness of about 100 Å to about 1000 Å, such as 200 Å to about 500 Å, has been found suitable.

As in conventional practices, an underlayer can be deposited on the textured substrate prior to depositing the magnetic layer. The underlayer can comprise chromium or a chromium-alloy, such as chromium-vanadium or chromium-titanium, oxygen-doped chromium, tungsten or a tungsten alloy.

In addition, a protective overcoat, such as a carbon overcoat, can be deposited on the magnetic layer, and a lubricant topcoat deposited on the protective overcoat. The underlayer, magnetic layers and protective overcoat can be applied in a conventional manner, by any of various sputtering techniques, deposited in conventional thicknesses employed in production of magnetic recording media.

The present invention can be employed to produce any of various types of magnetic recording media, including thin film disks, with an attendant improvement in flying stability, glide performance and head-medium interface reliability. The present invention advantageously eliminates the formidable requirements of conventional laser delivery systems for maintaining precise alignment of a complex system of mirrors and lenses in laser texturing a substrate to achieve a flying height of less than about 300 Å. The use of fiber optic cables in accordance with the present invention facilitates alignment and minimizes maintenance of precise alignment, even in geographical regions subject to unstable environmental conditions, particularly seismological disturbances.

Only the preferred embodiment of the invention and but a few examples of its versatility are shown and described in the present invention. It is to be understood that the invention is capable of use in various other combinations and environments and is capable of changes or modifications within the scope of the inventive concept as expressed herein.

What is claimed is:

1. An apparatus for laser texturing a substrate for a magnetic recording medium, which apparatus comprises:
    a laser light beam source;
    a spindle for rotating the substrate during laser texturing;
    a first lens positioned proximate a first surface of the substrate; and
    a first fiber optic cable having a first end optically linked to the laser light beam source and a second end optically linked to the first lens through which a laser light beam is passed to the first lens to impinge on the first surface of the substrate.

2. The apparatus according to claim 1, further comprising:
    a second lens positioned proximate a second surface of the substrate opposite the first surface; and
    a second fiber optical cable having a first end optically linked to the laser light beam source and a second end optically linked to the second lens through which a laser light beam is passed to the second lens to impinge on the second surface of the substrate.

3. The apparatus according to claim 2, wherein the first and second lenses are microfocusing lenses.

4. The apparatus according to claim 3, wherein the first microfocusing lens and the second microfocusing lens have substantially the same focal length.

5. The apparatus according to claim 3, further comprising:
    a third fiber optic cable having a first end optically linked to the laser light beam source and a second end optically linked to a beam splitter; wherein, the first end of the first and second fiber optic cables are optically linked to the beam splitter.

6. The apparatus according to claim 5, wherein the first end of the third fiber optic cable is optically linked to the laser light source sequentially through an attenuator and an electrical shuttle.

7. The apparatus according to claim 2, wherein the first and second surfaces each comprises a metal.

8. A method of manufacturing a magnetic recording medium, which method comprises:
    passing a first sub-laser light beam through a first fiber optic cable and then through a first lens to impinge the first sub-laser light beam on a first surface of a rotating substrate to texture the first surface of the substrate.

9. The method according to claim 8, further comprising:
    passing a second sub-laser light beam through a second fiber optic cable and then through a second lens to impinge the second sub-laser light beam on a second surface of the rotating substrate opposite the first surface to texture the second surface of the substrate.

10. The method according to claim 9:
    passing a laser light beam through a third fiber optic cable to a fiber optic beam splitter; and
    splitting the laser light beam into the first and second sub-laser light beams.

11. The method according to claim 10, comprising:
    passing the laser light beam from the laser light beam source sequentially through an electrical shuttle and attenuator to the third fiber optic cable.

12. The method according to claim 9, wherein the first and second lenses are microfocusing lenses.

13. The method according to claim 12, wherein the first microfocusing lens and the second microfocusing lens have substantially the same focal length.

14. The method according to claim 9, wherein the first and second surfaces each comprises a metal.

15. The method according to claim 8, further comprising:
    depositing an underlayer on the laser textured surface; and
    depositing a magnetic layer as the underlayer.

16. The method according to claim 15, further comprising:
    depositing a protective overcoat on the magnetic layer; and
    depositing a lubricant topcoat on the protective overcoat.

* * * * *